US009532387B2

(12) United States Patent
Marshall et al.

(10) Patent No.: US 9,532,387 B2
(45) Date of Patent: Dec. 27, 2016

(54) ANCILLARY DATA FOR AN EMERGENCY SERVICES CALL

(71) Applicants: Roger Stuart Marshall, Auburn, WA (US); Todd Poremba, Seattle, WA (US); Kent A. Hellebust, Woodinville, WA (US)

(72) Inventors: Roger Stuart Marshall, Auburn, WA (US); Todd Poremba, Seattle, WA (US); Kent A. Hellebust, Woodinville, WA (US)

(73) Assignee: Telecommunication Systems, Inc., Annapolis, MD (US)

(*) Notice: Subject to any disclaimer, the term of this patent is extended or adjusted under 35 U.S.C. 154(b) by 0 days.

(21) Appl. No.: 14/869,407

(22) Filed: Sep. 29, 2015

(65) Prior Publication Data

US 2016/0227589 A1 Aug. 4, 2016

Related U.S. Application Data

(60) Provisional application No. 62/110,318, filed on Jan. 30, 2015.

(51) Int. Cl.
*H04W 76/00* (2009.01)
*H04W 4/22* (2009.01)
*H04W 4/02* (2009.01)

(52) U.S. Cl.
CPC ............ *H04W 76/007* (2013.01); *H04W 4/02* (2013.01); *H04W 4/22* (2013.01)

(58) Field of Classification Search
CPC .......... H04W 4/22; H04W 4/02; H04W 64/00; H04W 76/007; H04M 2242/04; H04M 3/5116; H04M 11/04; H04M 2242/30; H04M 7/006; H04L 65/1016
See application file for complete search history.

(56) References Cited

U.S. PATENT DOCUMENTS

| 8,180,316 | B2* | 5/2012 | Hwang | H04M 11/04 379/111 |
| 2002/0057764 | A1* | 5/2002 | Salvucci | H04M 3/51 379/37 |
| 2004/0184584 | A1* | 9/2004 | McCalmont | H04M 3/42 379/45 |

(Continued)

*Primary Examiner* — Nizar Sivji
(74) *Attorney, Agent, or Firm* — Tarolli, Sundheim, Covell & Tummino LLP

(57) ABSTRACT

A system can include an emergency call routing element comprising one or more computing devices. The emergency call routing element can be configured to provide locator key and routing information for an emergency services call initiated by an end-user device employed by a caller, wherein the routing information identifies a Public Safety Answering Point (PSAP). The emergency call routing element can also be configured to provide a notification of the emergency services call. The system can also include an ancillary data server comprising one or more computing devices. The ancillary data server can be configured to receive the notification of the emergency services call and query an information source for information related to at least one of the end-user device and the caller in response to the notification. The ancillary data server can further be configured to provide a web service interface that outputs ancillary information that characterizes ancillary data.

19 Claims, 3 Drawing Sheets

(56) References Cited

U.S. PATENT DOCUMENTS

| | | | |
|---|---|---|---|
| 2005/0053209 A1* | 3/2005 | D'Evelyn | H04M 3/5116 379/111 |
| 2011/0026440 A1* | 2/2011 | Dunn | H04M 3/5116 370/259 |
| 2013/0029634 A1* | 1/2013 | Li | H04W 4/22 455/404.2 |
| 2013/0143516 A1* | 6/2013 | Winterbottom | H04W 4/22 455/404.2 |
| 2013/0303196 A1* | 11/2013 | Mitchell | G01S 5/0018 455/456.3 |

* cited by examiner

ANCILLARY DATA FOR AN EMERGENCY SERVICES CALL

CROSS-REFERENCE TO RELATED APPLICATION

This application claims the benefit of priority to U.S. Provisional Application No. 62/110,318, filed on 30 Jan. 2015, and entitled ANCILLARY DATA DELIVERY MECHANISM FOR EMERGENCY COMMUNICATION, the entirety of which is herein incorporated by reference, this application is also related to a commonly assigned patent applications entitled TRIGGER MECHANISM, which claims the benefit of priority to U.S. Provisional Patent Application No. 62/110,329, filed on 30 Jan. 2015, and entitled, E9-1-1 ALI TRIGGER SYSTEM AND METHOD TO SUPPLY ENHANCED DATA the entirety of each is herein incorporated by reference.

TECHNICAL FIELD

This disclosure relates to an ancillary data server that provides ancillary data for an emergency services call.

BACKGROUND 9-1-1 is a phone number widely recognized in North America as an emergency phone number that is used to contact emergency dispatch personnel. Enhanced 9-1-1 (E9-1-1) is defined by an emergency call being selectively routed to an appropriate Public Service Answering Point (PSAP), based on an identifier, such as an Automatic Number Identifier (ANI), a Pseudo Automatic Number Identifier (pANI), an Emergency Services Routing Key (ESRK), any of which can generically be referred to an ESxK or a locator key. The locator key can include the transmission of callback number and location information when 9-1-1 is used. E9-1-1 may be implemented for wireless (e.g., cellular) landline, or VoIP networks.

A PSAP is a dispatch office that receives 9-1-1 calls (voice or text messages) from the public. A PSAP may be a local, fire or police department, an ambulance service or a regional office covering all services. As used herein, the term PSAP can alternatively refer to an Emergency Call Center (ECC) a term employed for Voice over Internet Protocol (VoIP) systems.

SUMMARY

One example relates to a system that can include an emergency call routing element including one or more computing devices. The emergency call routing element can be configured to provide a locator key and routing information for an emergency services call initiated by an end-user device employed by a caller, wherein the routing information identifies a Public Safety Answering Point (PSAP). The emergency call routing element can also be configured to provide a notification of the emergency services call. The system can also include an ancillary data server including one or more computing devices. The ancillary data server can be configured to receive the notification of the emergency services call and query an information source for information related to at least one of the end-user device and the caller in response to the notification. The ancillary data server can also be configured to provide a web service interface that outputs ancillary information that characterizes ancillary data received from the information source.

Another example relates to a system that can include an emergency call routing element including one or more computing devices, the emergency call routing element being configured to assign a locator key to an end-user device in response to receiving an indication of an emergency services call initiated by a caller employing the end-user device. The emergency call routing element can also be configured to query a location server for location information for the end-user device. The location information can characterize geographic coordinates of the end-user device. The emergency call routing element can further be configured to determine routing information for the emergency services call based on the location information. The routing information can identify a PSAP. The emergency call routing element can still further be configured to provide a notification of the emergency services call. The system can also include an ancillary data server including one or more computing devices. The ancillary data server can be configured to receive the notification of the emergency services call. The ancillary data server can also be configured to query each of a plurality of information sources for information related to at least one of the end-user device and the caller in response to the notification. The ancillary data server can further be configured to collate ancillary data provided from each of the plurality of information sources to form ancillary information characterizing information related to the end-user device and/or the caller.

Still another example relates to a method that can include receiving a notification of an emergency services call initiated with an end-user device by a caller. The notification can include a locator key assigned to the end-user device. The method can also include receiving a location request from a PSAP for the emergency services call. The method can further include requesting ancillary data for at least one of the caller and the end-user device from a plurality of information sources in response to the notification and the location request. The method can still further include collating ancillary data provided from each of the plurality of information sources to form ancillary information related to at least one of the user and the end-user device.

DETAILED DESCRIPTION

Example systems and methods described herein can be invoked in response to initiation of an emergency services call by an end-user device, based on a configured rule (e.g., location proximity, destination Public Safety Answering Point (PSAP), etc.). In some examples, the systems and methods allows the emergency services call to be normally routed to a primary PSAP, such as the relevant authorities in a municipality. Additionally, ancillary data relating to the emergency services call (particularly data related to the end-user device and/or the caller) can be concurrently delivered to a user terminal that could be operating at the PSAP or a different call answering entity, such as a secondary call center staffed by a smaller related authority, a business or university campus within the municipality. In this example, the secondary call center can include a security department with personnel that may desire to know information of every wireless emergency call made within boundaries of a campus, thereby being alerted to the nature of emergency events substantially in real-time. Having ready access to such ancillary information would provide campus personnel with augmented location information, such as an indoor location data including building floor plan maps, hazardous materials information and other data relevant to an emergency situation.

Figure 1:
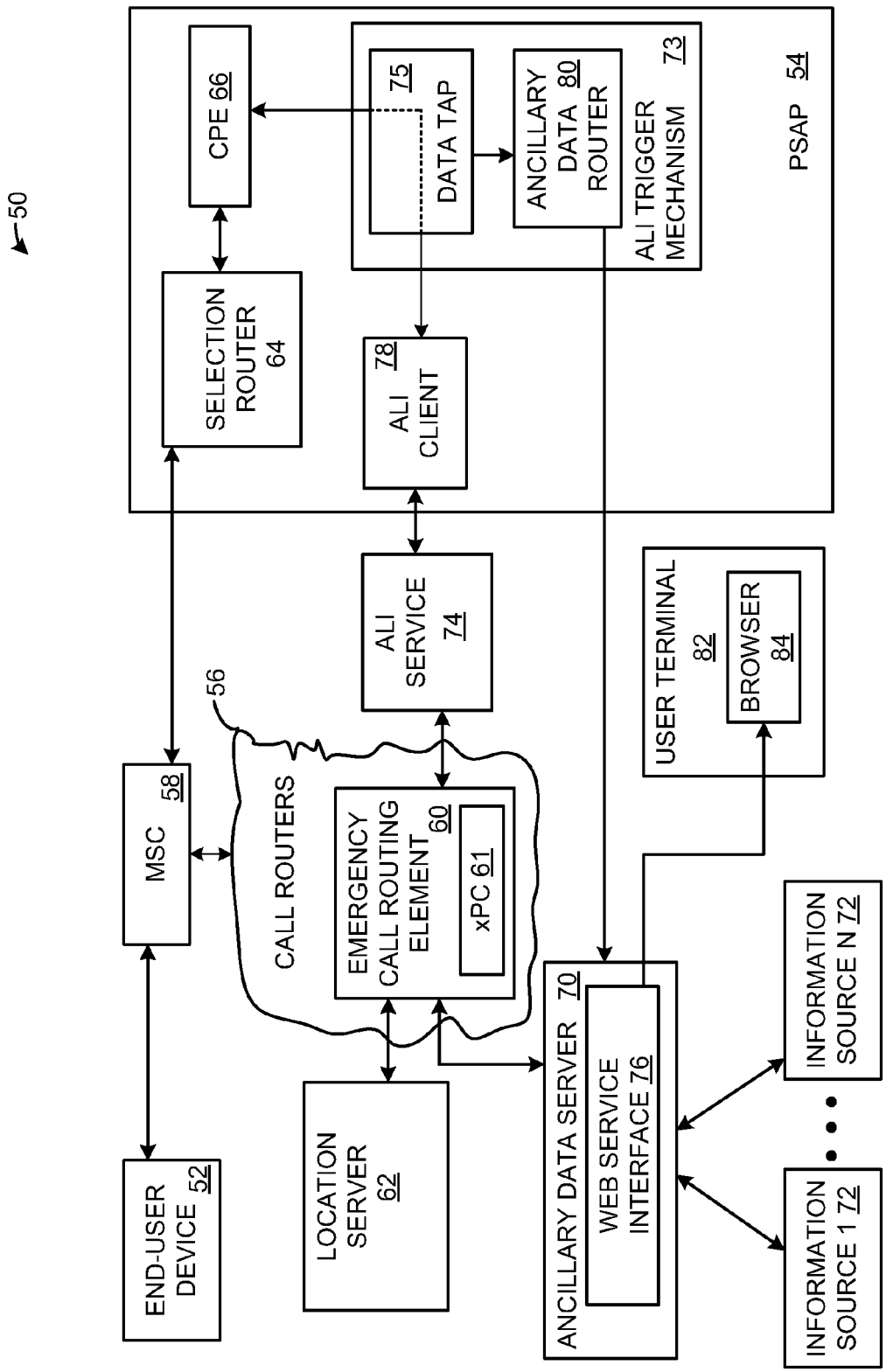
FIG. 1 illustrates an example of a system configured to process an emergency services call.

FIG. 1 illustrates an example of a system 50 configured to facilitate the processing of emergency service calls. Communication between nodes of the network can be conducted via a private network (e.g., a wireless carrier network), a public network (e.g., the Internet), or a combination thereof. The system 50 can include an end-user device 52 operated by an end-user, which end-user can be referred to as a caller. The end-user device 52 can be a mobile device, such as a wireless phone (e.g., a smart phone, a feature phone, etc.). In some examples, the end-user device 52 can be a Voice over Internet Protocol (VoIP) phone or a wireline phone (e.g., a landline phone).

The end-user device 52 can be employed by the caller to initiate an emergency services call. The emergency services call can be, for example, a voice 9-1-1 call, a 9-1-1 text (or short) message (e.g., a short message service (SMS) message), etc. The emergency services call can be a request for immediate emergency assistance, including ambulatory service, police assistance, fire department assistance, assistance on waterways or some combination thereof. In some examples, the end-user device 52 may be issued or controlled by a particular enterprise (e.g., a business) that maintains its own call center (e.g., a secondary call center) for handling emergency service calls.

The emergency services call can be routed to a PSAP 54 via call routers 56 in a manner described herein. In particular, the end-user device 52 can be connected to a Mobile Switching Center (MSC) 58. The MSC 58 can be implemented as a primary service delivery node for the end-user device 54. The MSC 58 can be connected to the call routers 56. The call routers 56 can be representative of a collection of telephony routers, including, but not limited to a cell tower, selective routers, etc. The call routers 56 can be implemented as part of the Public Switched Telephone Network (PSTN), the Internet and/or as part of a private network (e.g., a wireless carrier network).

The MSC 58 can provide a notification of the emergency services call to an emergency call routing element 60 of the call routers 56. The emergency call routing element 60 can be configured as a router (e.g., a hardware device). In some examples, the emergency call routing element 60 can be implemented as a distributed computing device (e.g., an instance of virtual hardware) executing in a computing cloud. In other examples, the emergency services call routing element 60 can be implemented as a single instance of hardware. The emergency call routing element 60 can include the functionality and/or structure of a positioning center, which can be referred to as an "xPC" 61. The xPC 61 of the emergency call routing element 60 can be representative of nearly any non-landline positioning center, including a Mobile Positioning Center (MPC), a Gateway Mobile Positioning Center (GMLC), a VoIP Positioning Center (VPC), etc. It is also noted that in some examples, the xPC 61 and the emergency call routing element 60 can be implemented on separate computing devices that communicate with each other.

In response to the notification of the emergency services call, the emergency call routing element 60 can be configured to assign a locator key to the emergency services call and determine routing information for the emergency services call. The locator key can be implemented as a Automatic Number Identifier (ANI) (e.g., a standard telephone number), a Pseudo Automatic Number Identifier (pANI), an Emergency Services Routing Key (ESRK), an Emergency Services Query Key (ESQK), any of which can alternatively be generically be referred to as an ESxK.

The emergency call routing element 60 can be configured to communicate with a location server 62, such as a 9-1-1 location server. The location server 62 can be configured to determine location information for the end-user device 52. In some examples, the location information of the end-user device 52 can be geographic coordinates (e.g., latitude and longitude coordinates) that can be determined from a query to the end-user device 52. In other examples, the location information of the end-user device 52 can be derived from identification of a plurality of cell towers communicating with the end-user device 52 via triangulation. In still other examples, the location information can be a street address associated with the end-user device 52. The location information can be returned to the emergency call routing element 60. The emergency call routing element 60 can store the location information in a database and/or lookup table that can be indexed by the locator key. That is, the locator key can be employed to identify the location information for the end-user device 52.

The emergency call routing element 60 can employ the location information to determine the routing information for the emergency services call. The routing information can identify a primary PSAP 54 (or other call center) that can service the emergency services call. The selection of the PSAP 54 can be based, for example, on a geographic location of the end-user device 52. The locator key and the routing information for the emergency services call can be provided to the MSC 58.

The MSC 58 can forward the emergency services call to the PSAP 54 (identified by the emergency call routing element 60). The MSC 58 can include the locator key with the emergency services call forwarded to the PSAP 54. The PSAP 54 can include a selection router 64 that can route the emergency services call to an appropriate instance of customer premise equipment (CPE) 66 (e.g., a PSAP operator terminal). The selection router 64 can be implemented, for example, as a private branch exchange (PBX) system. The CPE 66 can be implemented, for example, as a user terminal that implements standard PSAP software. The CPE 66 can be employed by a PSAP operator to establish bi-directional communication (e.g., voice or text) with the caller making the emergency services call. In some examples, the CPE 66 can implemented as an i3 PSAP system that can support rich data (e.g., multimedia data). In other examples, the CPE 66 can be implemented as a legacy user terminal (e.g., a text only terminal).

The emergency call routing element 60 can be configured to provide a notification of the emergency services call to an ancillary data server 70, which can alternatively be referred to as an ancillary data manager and/or a metadata server. It is noted that the notification of the emergency services call can be provided to the ancillary data server 70 independent of the forwarding of the emergency services call to the PSAP 54. Thus, if the operations of the PSAP 54 are disabled for any reason (e.g., power failure), the operations of the emergency call routing element 60 and the ancillary data server 70 can continue. The notification of the emergency services call can include the locator key and (in some examples) the location information for the end-user device.

The ancillary data server 70 can be implemented as a distributed computing device (e.g., a cloud server) implemented over a plurality of computing devices or a as a single server.

The ancillary data server 70 can be configured to query N number of information sources 72 for information related to the caller and/or the end-user device 52, where N is an integer greater than or equal to one. The information sources 72 can include, for example, databases and/or lookup tables, such as a telephone directory, a map, a wireless carrier information directory, WiFi and/or Bluetooth router directories (including Bluetooth Low Energy (BLE) directories), social media sites, building diagram directories, etc. The N number of information sources 72 can return ancillary data related to the caller and/or the end-user device 52 making the emergency services call. The ancillary data can include, for example, indoor location information, map data, building layouts, WiFi and/or Bluetooth connection data, etc. For instance, if a given information source 72 is a wireless carrier information directory, the altitude (detected on the end-user device 52) may be provided to the ancillary data server 70. Additionally or alternatively, information related to a building layout may be provided to the ancillary data server 70.

The ancillary data server 70 can collate the ancillary data received from each of the N number of information sources 72 and/or the location information for the end-user device to generate ancillary caller information for the caller and/or the end-user device 52. The ancillary caller information can be implemented as data that includes information not accessible by a conventional (legacy) location system, such as an Automatic Location Identifier (ALI) service 74. That is, in some examples, the ancillary caller information can be a superset of the information provided at the CPE 66. For instance, the ancillary caller information can include a fine location (e.g., more accurate relative to the coarse location information provided by the ALI service 74) such as indoor or outdoor location information, including altitude as well as the location information provided by the ALI service 74. As one example, the outdoor or indoor location information can be derived based on a received wireless network connectivity status (e.g., a WiFi and/or Bluetooth connectivity status) of the end-user device 52. The ancillary data server 70 can include a web service interface 76 (e.g., an interface for a web browser, such as a web page) that can convert the ancillary caller information into a standard format, such as nearly any version of the Hypertext Markup Language (HTML).

The system 50 can also include the ALI service 74. The ALI service 74 can be configured with an interface for the emergency call routing element 60. The ALI service 74 can be representative of a plurality of computing devices (e.g., a computing cloud) operating in concert to deploy the ALI service 74. Alternatively, the ALI service 74 can be implemented with a single server.

The emergency services call routed to the CPE 66 can include the locator key that can (at least temporarily) uniquely identify the end-user device 52. The CPE 66 can provide an ALI location request to an ALI client 78 that includes the locator key. The ALI location request can be implemented as a request in the extended ALI format, National Emergency Number Association (NENA) 04-001 (ALI Request) as bits on a wire, a network request (e.g., a TCP/IP) formatted message, etc. The ALI client 78 can be an interface for the ALI service 74. In some examples, the ALI service 74 and the ALI client 78 can be integrated on a single server, such as a server located at the PSAP 54. In other examples, the ALI client 78 can be physically separated from the ALI service 74. An ALI trigger mechanism 73 can be configured to detect the ALI location request.

In some examples, the CPE 66 can be coupled (directly or indirectly) to the ALI client 78 via an RS232 cable (e.g., a serial cable). In other examples, the CPE 66 can be coupled to the ALI client 78 with a network connection (e.g., an Ethernet cable) or a proprietary cable. The ALI trigger mechanism 73 can include a data tap 75 that can detect the ALI location request.

The data tap 75 can be implemented as a passive component (e.g., a splitter) or an active component (e.g., a switch). As used herein, the term "passive component" indicates that the component can operate without the application of external power (e.g., for amplification). The data tap 75 does not interrupt (or otherwise interfere with) the ALI location request being provided to the ALI client 78. Instead, the data tap 75 provides a trigger signal to an ancillary data router 80 (e.g., a metadata router) of the ALI trigger mechanism 73 in response to detecting the ALI location request. The trigger signal can include the information included in the ALI location request, including the locator key assigned to the end-user device 52 for the emergency services call. The ancillary data router 80 can be a computing device (e.g., a router) that can be configured to provide an ancillary caller information request for the caller employing the end-user device 52 to make the emergency services call. The ancillary caller information request can be provided over a network protocol such as the E2 protocol, TCP/IP, a proprietary network protocol, etc.

The ALI client 78 can forward the ALI location request to the ALI service 74. The ALI service 74 can query the emergency call routing element 60 for a location corresponding to the locator key. The ALI service 74 can receive the location information from the emergency call routing element 60 and forward the location information back to the ALI client 78. The ALI client 78 can forward the location information for the caller to the CPE 66. The CPE 66 can output text that characterizes the location information that can be read by the operator of the CPE 66.

Additionally, in some examples, the ancillary data router 80 (rather than being provided with the emergency call notification from the emergency call routing component 60) can forward the location information along with the locator key to the ancillary data server 70. The ancillary data server 70 can augment the ancillary caller information with the location information for the emergency services call. In this situation, the ancillary caller information can include all the conventional information available to the CPE 66 of the PSAP 54 (e.g., coarse location information), as well as the ancillary information collected from the N number of information sources 72. That is, the ancillary caller information can be a superset of the information available to the CPE 66 of the PSAP 54. Additionally, it is noted that in some instances, the ancillary caller information can omit the location information provided by the ancillary data route 80, such as situations where the ancillary data router 80 or other component of the PSAP 54 is inoperable.

The system 50 can include a user terminal 82. The user terminal 82 can be implemented as a computing device with a graphical user interface (GUI), such as a desktop computer, a laptop computer, a tablet computer, a smartphone, etc. In some examples, the user terminal 82 can be located at a secondary call center. For instance, the user terminal 82 can be implemented at a security desk (e.g., a secondary security center of the enterprise), a first responder (e.g., an ambulance or police vehicle) or virtually anywhere else. In other examples, the user terminal 82 can be integrated with the CPE 66 of the PSAP 54, such as situations where the CPE 66 is implemented to accept rich data (e.g., the CPE 66 is an i3 PSAP). In other examples, the user terminal 82 can be physically located at the PSAP 54 and employed by the same PSAP operator as the CPE 66, but can be implemented as a separate device. Further, in some examples, there may be multiple instances of the user terminal 82 running concurrently, such as situations where there is a user terminal 82 at both the secondary call center and the PSAP 54.

The user terminal 82 can execute a web browser 84. The web browser 84 can include an application (e.g., a plug-in) that can periodically and/or intermittently query the web service interface 76 (e.g., via a network, such as the Internet) for updates for emergency services calls. In other examples, the web service interface 76 can push updates to emergency service calls to the web browser 84 asynchronously, such as in response to determining the ancillary caller information for the emergency services call. The web service interface 76 can provide the web browser 84 with the ancillary caller information for the caller and/or the end-user device 52 via a standard web protocol, such as the Hypertext Transfer Protocol Secure (HTTPS) protocol. The web browser 84 can provide a GUI that can output the ancillary caller information that characterizes and/or is related to the caller and/or the end-user device 52 (e.g., as a web page).

In some examples, the ancillary data server 70 can periodically re-query each of the N number of information sources 72 (or some subset thereof) for updated information. In response to such updated information, the ancillary data server 70 can re-collate the ancillary caller information, and push the updated ancillary caller information to the web browser 84 substantially in real time (e.g., within about 10 seconds). In response, the web browser 84 can update the GUI to reflect the update to the ancillary caller information. In this manner, real time information updates can be observed by a user of the user terminal 82. For instance, such real time information updates can appear as real-time updates to a location of the end-user device 52, such that movement of the end-user device 52 can be tracked continuously or intermittently.

By employing the system 50, the ancillary caller information can be determined and provided to the user terminal 82 in response to notification of the emergency services call. Moreover, no changes are needed to legacy location services (e.g., the ALI service 74 and/or the ALI client 78). Thus, the emergency call routing element 60 and the ancillary data server 70 can be integrated with the system 50 with minimal deployment costs.

Figure 2:
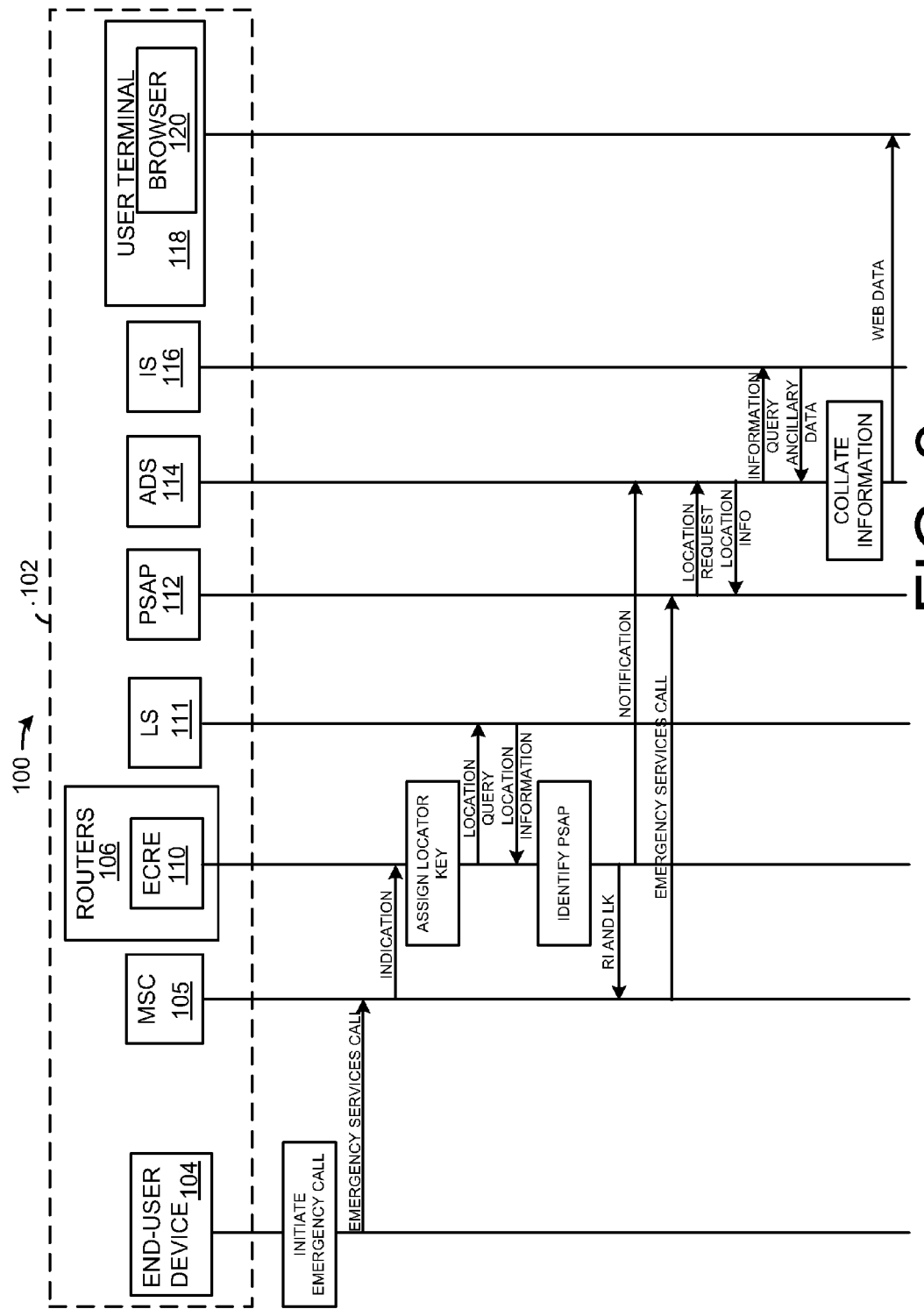
FIG. 2 illustrates an example of a timing diagram of a system configured to process an emergency services call.

FIG. 2 illustrates a timing diagram 100 for a system 102 to provide ancillary data for emergency services calls. The system 102 can include nodes that communicate over a public network, such as the Internet, a private network, such as a wireless carrier network or a combination thereof. The system 102 can include an end-use device 104. The end-user device 104 can be implemented, for example, as a wireline phone, a VoIP phone, a wireless phone, etc. The end-user device 104 can be employed to implement the end-user device 52 illustrated in FIG. 1.

The end-user device 104 can be employed to initiate an emergency services call (e.g., a 9-1-1 voice or text call in North America). A user of the end-user device 104 can be referred to as a caller (of the emergency services call). The end-user device 104 can be connected with an MSC 105, which can be implemented as a primary service node on a wireless subscriber network that communicates with the end-user device 104. The MSC 105 can detect that the call is an emergency services call (e.g., by detecting that the call is directed to an emergency services contact center (e.g., the call has "9-1-1" digits). The MSC 105 can process the emergency services call and send an indication (e.g., a notification) to call routers 106. The routers 106 can be representative of telephony network components and/or Internet network components needed to route or provide routing information to connect the emergency services call to an appropriate call handling facility (e.g., a PSAP).

The routers 106 can include an emergency call routing element 110 (labeled in FIG. 2 as "ECRE 110") that can receive the indication of the emergency services call. The emergency call routing element 110 can provide a location query to a location server 111 (labeled in FIG. 2 as "LS 111"). The location server 111 can be employed to implement the location server 62 illustrated in FIG. 1. The location server 111 can return location information (e.g., geographic coordinates, a cell area and/or a street address) of the end-user device 104 to the emergency call routing element 110.

The emergency call routing element 110 can employ the location information to identify a primary PSAP 112 (or other call center) to which to route the emergency services call. The emergency call routing element 110 can provide the routing information (including the identity of the PSAP 112) and the locator key to the MSC 105 (labeled in FIG. 2 as "RI AND LK"). The emergency call routing element 110 can store (e.g., in a database or lookup table) the location information for the end-user device 104 that can be indexed by the locator key.

Additionally, in some examples, the emergency call routing element 110 can provide a notification of the emergency services call to an ancillary data server 114 (labeled in FIG. 2 as "ADS"). The ancillary data server 114 can be employed to implement the ancillary data server 70 of FIG. 1. The notification can include the locator key and (in some examples) the location information for the end-user device 52.

The MSC 105 can forward the emergency services call to selection router of the PSAP 112 based on the routing information. The forwarded emergency services call can include the locator key assigned to the end-user device 104. Additionally, the PSAP 112 (e.g., via an ALI trigger mechanism and an ALI client) can send a location request to the ancillary data server 114. Moreover, the location request may be sent to another system (e.g., an ALI service). In response to the location request, the ancillary data server 114 and/or another system, such as the ALI service, can provide location information (labeled in FIG. 2 as "LOCATION INFO") to the PSAP 112. The location information can be output at the PSAP 112 (e.g., at CPE) for an operator.

Figure 3:
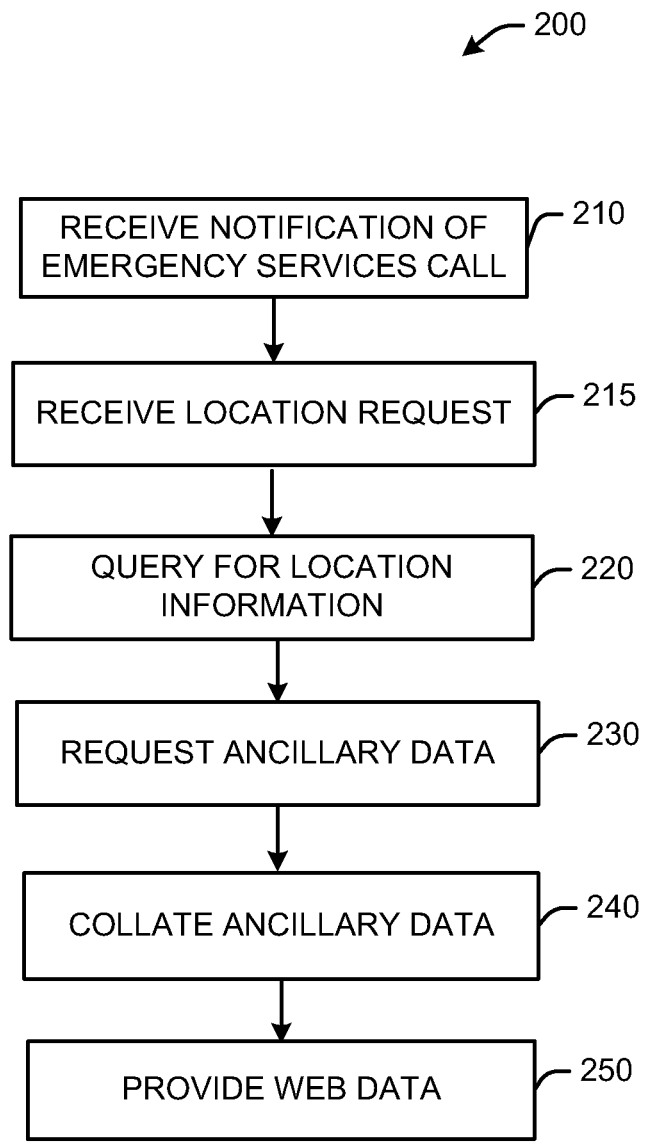
FIG. 3 illustrates a flowchart of an example method for processing an emergency services call.

In response to the notification from the emergency call routing element 110 and/or the detection of the location request from the PSAP 112, the ancillary data server 114 can send an information query to an information source 116 (labeled in FIG. 3 as "IS 116"). The information source 116 can be representative of the N number of information sources 72 illustrated in FIG. 1. The information source 116 can return ancillary data to the ancillary data server 114. As discussed with respect to FIG. 1, the ancillary data can include, but is not limited to building layouts, indoor location information, outdoor location information, WiFi and/or Bluetooth (including Bluetooth Low Energy) connection data, map data, etc. The ancillary data server 114 can collate the ancillary data to form ancillary caller information related to the caller and/or the end-user device 104. The web data can be pushed (or provided in response to a request) to a web browser 120 operating on a user terminal 118.

In some examples, the user terminal 118 may be operating at a secondary call center, such as a security desk. In other examples, the user terminal may be operating at the PSAP 112. In some such situations, the PSAP 112 may employ i3 PSAP terminals that can output both legacy (e.g., ALI) location information and the ancillary caller information (e.g., rich data).

In view of the foregoing structural and functional features described above, example methods will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 3 can be implemented as instructions stored in a non-transitory machine-readable medium. The instructions can be accessed by a processing resource (e.g., one or more processor cores) and executed to perform the methods disclosed herein.

FIG. 3 illustrates a flowchart of an example method 200 for generating ancillary data for an emergency services call. The method 200 can be implemented, for example, by the ancillary data server 70 of FIG. 1 and/or the ancillary data server 114 of FIG. 2. The emergency services call can be made by a user (e.g., a caller) employing an end-user device (e.g., the end-user device 52 of FIG. 1). At 210, a notification, from an emergency call routing element (e.g., the emergency call routing element 60 of FIG. 1) of an emergency services call initiated by the end-user device can be received at the ancillary data server. The notification can include, for example, a locator key assigned to the end-user device. At 215, a location request can be received at the ancillary data server. The location request could be, for example, an ALI location request that includes the locator key assigned to the end-user device.

At 220, the ancillary data server can query the emergency services routing element for location information that can be returned to the PSAP. At 230 the ancillary data server can provide a request to an information source (e.g., the N number of information sources 72 of FIG. 1) for ancillary data. The query can be sent in response to the notification and/or the location request. The ancillary data can characterized information relevant to the call and/or the end-user device. At 240, the ancillary data server can collate the ancillary data and the location data to form ancillary caller information. At 250, the ancillary data server can provide web data to a user terminal (e.g., the user terminal 82) characterizing the ancillary caller information.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
an emergency call routing element comprising one or more computing devices, the emergency call routing element being configured to:
provide a locator key and routing information for an emergency services call initiated by an end-user device employed by a caller, wherein the routing information identifies a Public Safety Answering Point (PSAP);
provide a notification of the emergency services call; and
an ancillary data server comprising one or more computing devices, the ancillary data server being configured to:
receive the notification of the emergency services call;
query a plurality of information sources for information related to at least one of the end-user device and the caller in response to the notification;
collate ancillary data received from each of the plurality of information sources to form ancillary information; and
provide a web service interface that outputs the ancillary information that characterizes the ancillary data.

2. The system of claim 1, wherein the ancillary data server is further configured to:
receive a location request for the end-user device from the PSAP; and
retrieve location information for the end-user device in response to the location request.

3. The system of claim 2, wherein the location request comprises an Automatic Location Identifier (ALI) request.

4. The system of claim 2, wherein the ancillary data server is further configured to:
collate the location information with the data received from the plurality of information sources.

5. The system of claim 2, wherein a given information source of the plurality of information sources provides indoor location information for the end-user device.

6. The system of claim 2, wherein a given information source of the plurality of information sources provides at least one of WiFi and Bluetooth connectivity status of the end-user device.

7. The system of claim 2, wherein the ancillary data server is further configured to:
periodically re-query each of the plurality of information sources for updated ancillary data; and
re-collate the ancillary information in response to receiving updated ancillary data.

8. The system of claim 2, wherein a user terminal comprising one or more computing devices is configured to:
access the web service interface of the ancillary data server and outputs data; and
provide a graphical user interface (GUI) that outputs the ancillary information.

9. The system of claim 8, wherein the user terminal is integrated with an operator terminal at the PSAP.

10. The system of claim 8, wherein the user terminal operates at a secondary call center.

11. The system of claim 8, wherein the ancillary information is a superset of information provided to the PSAP.

12. The system of claim 8, wherein the ancillary information is updated substantially in real-time.

13. The system of claim 1, wherein the emergency call routing element is further configured to:
query a location server for location information of the end-user device; and
store the location information of the end-user device in a lookup table or database that is indexed by the locator key assigned to the end-user device.

14. The system of claim 13, wherein the location information characterizes a course location of the end-use device and the ancillary information characterizes a fine location of the end-user device.

15. A system comprising:
an emergency call routing element comprising one or more computing devices, the emergency call routing element being configured to:
assign a locator key to an end-user device in response to receiving an indication of an emergency services call initiated by a caller employing the end-user device;
query a location server for location information for the end-user device, wherein the location information characterizes geographic coordinates of the end-user device;
determine routing information for the emergency services call based on the location information, wherein the routing information identifies a Public Safety Answering Point (PSAP);
provide a notification of the emergency services call; and
an ancillary data server comprising one or more computing devices, the ancillary data server being configured to:
receive the notification of the emergency services call;
query each of a plurality of information sources for information related to at least one of the end-user device and the caller in response to the notification;
collate ancillary data provided from each of the plurality of information sources to form ancillary information characterizing information related to the end-user device and/or the caller; and
provide a web service interface that outputs the ancillary information that characterizes ancillary data.

16. The system of claim 15, wherein the ancillary data received from a given information source of the plurality of information sources comprises outdoor location information based on a wireless network connectivity status of the end-user device.

17. The system of claim 15, wherein the ancillary data server is further configured to convert the ancillary information into the Hypertext Markup Language (HTML) format.

18. A method comprising:
receiving a notification of an emergency services call initiated with an end-user device by a caller, wherein the notification includes routing information for the emergency services call and a locator key assigned to the end-user device, wherein the routing information identifies a Public Safety Answering Point (PSAP) for the emergency services call;
receiving a location request from the identified Public Safety Answering Point (PSAP) for the emergency services call;
requesting ancillary data for at least one of the caller and the end-user device from a plurality of information sources in response to the notification and the location request;
collating ancillary data provided from each of the plurality of information sources to form ancillary information related to at least one of the user and the end-user device;

generating a web service interface that outputs the ancillary information that characterizes the ancillary data.

19. The method of claim 18, wherein the location request is an Automatic Location Identifier (ALI) request.

* * * * *